United States Patent [19]

McDaniel

[11] 4,325,839
[45] Apr. 20, 1982

[54] IMPREGNATED SECOND VALENCE CHROMIUM COMPOUND IN SUPPORTED CATALYST

[75] Inventor: Max P. McDaniel, Bartlesville, Okla.

[73] Assignee: Phillips Petroleum Company, Bartlesville, Okla.

[21] Appl. No.: 106,350

[22] Filed: Dec. 21, 1979

[51] Int. Cl.³ .................. C08F 4/78; C08F 4/22; C08F/10/02; C08F 4/16
[52] U.S. Cl. .................... 252/430; 252/458; 526/96; 526/106; 526/352
[58] Field of Search .................. 252/430, 252/458

[56] References Cited

U.S. PATENT DOCUMENTS

| | | | |
|---|---|---|---|
| 3,378,536 | 4/1968 | Walker et al. | 252/430 |
| 3,887,494 | 6/1975 | Dietz | 252/458 |
| 3,900,457 | 8/1975 | Witt | 252/458 |
| 3,976,632 | 8/1976 | Delap | 252/430 |
| 4,151,122 | 4/1979 | McDaniel et al. | 252/458 |
| 4,186,260 | 1/1980 | Dietz | 252/458 |
| 4,188,471 | 2/1980 | Hasser, Jr. et al. | 252/431 R |

*Primary Examiner*—P. E. Konopka

[57] ABSTRACT

A chromium catalyst supported on a silica-containing base is prepared having chromium present in both the hexavalent state and a lower valent state by anhydrously impregnating a second chromium compound onto the base which already has a chromium compound having a differnt chromium valance than said second chromium compound. For instance, a silica titanium cogel containing a chromium compound calcined to give hexavalent chromium can be anhydrously impregnated with a π-bonded organochromium compound such as dibenzene chromium or dicumene chromium. Resulting polymers have broad molecular weight distribution and can be made in slurry systems at a sufficiently high melt flow to be useful in applications such as blow molding of bottles and other hollow articles.

24 Claims, No Drawings

IMPREGNATED SECOND VALENCE CHROMIUM COMPOUND IN SUPPORTED CATALYST

BACKGROUND OF THE INVENTION

This invention relates to chromium containing olefin polymerization catalysts.

Supported chromium oxide catalysts can be used to prepare olefin polymers in a hydrocarbon solution to give a product having excellent characteristics from many standpoints. Supported chromium oxide catalysts can also be used to prepare olefin polymers in a slurry system wherein the polymer is produced in the form of small particles of solid material suspended in a diluent. This process, frequently referred to as a particle-form process, has the advantage of being less complex. However certain control operations which are easily carried out in the solution process are considerably more difficult in the particle-form process. For instance, in the solution process, control of the molecular weight can be effected by changing the temperature with lower molecular weight (higher melt flow) being obtained at the higher temperature. However, in the slurry process, this technique is inherently limited since any efforts to increase the melt flow to any appreciable extent by increasing temperature would cause the polymer to go into solution and thus destory the slurry or particle-form process. Also it is frequently desired to have a polymer with a broader molecular weight distribution than is normally obtained in the slurry or particle-form process.

SUMMARY OF THE INVENTION

It is an object of this invention to provide a catalyst capable of giving both high melt flow and broad molecular weight distribution polymer;

It is a further object of this invention to provide a catalyst suitable for use in slurry polymerization systems;

It is yet a further object of this invention to provide a catalyst capable of giving polymer suitable for blow molding and other applications requiring moderate to relatively high melt and broad molecular weight distribution.

In accordance with this invention, a chromium catalyst supported on a silica-containing base is prepared having chromium present in both the hexavalent state and a lower valent stage by anhydrously impregnating a second chromium compound on to the base which already has a chromium compound having a differing valence for the chromium component.

DESCRIPTION OF THE PREFERRED EMBODIMENTS

The support for the catalyst of this invention is a silica-containing material generally composed of 80 to 100 weight percent silica, the remainder, if any, being selected from alumina, boria, magnesia, thoria, titania, zirconia, or mixtures thereof. Preferably, the support is a large pore material prepared as described in U.S. Pat. Nos. 3,887,494 which issued June 3, 1975 to Dietz covering the preparation of silica-titania cogels and U.S. Pat. No. 3,900,457 which issued Aug. 19, 1975 to Witt covering the preparation of a synthetic silica, the disclosures of which are hereby incorporated by reference. Briefly, silica-titania cogels can be prepared by coprecipitating a silicate with a titanium compound and thereafter removing water by use of a water soluble oxygen containing organic compound such as ethyl acetate. The large pore silica-containing materials thus produced are preferred as the supports in this invention because the chromium-containing catalysts made with them exhibit a significantly higher melt index capability in the production of ethylene polymers in a particle form polymerization process. The large pores inherently produced when water is removed from the hydrogel by means of azeotropic distillation or otherwise washing with a water soluble oxygen-containing organic compound to form a xerogel are susceptible to being destroyed if the xerogel is subsequently contacted with water, however.

The catalyst for this invention can be formed in two ways. In the first embodiment, the support containing chromium in the hexavalent state is impregnated with a chromium compound wherein the chromium has a valence of 0, 2, or 3 using anhydrous impregnation. In the second embodiment, the support having chromium with a valence of 0, 2, or 3 is impregnated with a chromium compound wherein the chromium has a valence of 6 using anhydrous impregnation techniques.

Further with respect to the first embodiment, the silica base can be impregnated with a hexavalent chromium compound such as chromium trioxide, ammonium chromate, or other such hexavalent chromium compounds. Alternatively, the base can either be formed initially with a chromium compound present, for instance, by precipitating the chromium compound with the hydrogel or by adding a lower valent chromium compound such as chromium (III) acetate, chromium (III) nitrate, chromium (II) chloride, or other such lower valent chromium compounds which are convertable to hexavalent chromium on exposure to oxygen. The resulting chromium containing silica composition is then subjected to conventional calcination to convert at least a portion of the chromium to the hexavalent state.

The lower valent chromium species is then impregnated in an anhydrous fashion on the hexavalent chromium-containing support, excluding oxygen (i.e., impregnating in the substantial absence of oxygen) if necessary to prevent oxidation, to obtain the catalyst of the first embodiment of this invention. Suitable lower valent chromium compounds for this purpose include the following: (a) chromium (III) octoate; (b) a zero valent, $\pi$-bonded chromium complex such as a chromium arene complex (e.g. dicume chromium or dibenzene chromium); or other chromium compounds wherein chromium has a valence of less than 6. The $\pi$-bonded zero valent compounds are disclosed in more detail in U.S. Pat. No. 3,976,632, which issued Aug. 24, 1976 to Delap, the disclosure of which is hereby incorporated by reference. Suitable water-free solvents for use in impregnating the second chromium compound include hydrocarbons such as n-pentane and cyclohexane, ketones such as acetone and cyclohexanone, esters such as ethyl acetate and n-amyl acetate, alkanols such as ethanol and isopropanol, mixtures of the above solvents and other anhydrous or essentially anhydrous solvents.

In the second embodiment, the silica-containing support is dried, generally by conventional calcination, and thereafter admixed or impregnated anhydrously with a chromium compound having a valence of less than 6, the scope of lower valent compounds for use in the first step of the second embodiment being the same as those for use in the second step of the first embodiment. In both instances, the zero valent π-bonded organochromium compounds are preferred. Similarly, the same scope of anhydrous solvent is applicable to this initial impregnation of the lower valent chromium compound in the second embodiment as is used in the second step of the first embodiment. In the second step of the second embodiment a hexavalent chromium compound is anhydrously impregnated onto the support. Suitable compounds include chromium trioxide, tertiary butyl chromate, and other hexavalent chromium compounds which are soluble in non-aqueous systems. Similar anhydrous solvents to those described hereinabove are suitable. Particularly with chromium trioxide, acetonitrile can be used as a solvent.

The impregnation or impregnations of the second embodiment may also be carried out in the substantial absence of oxygen.

After the impregnations in either embodiment, the solvent can be removed by gentle heating, e.g. no more than about 100° C., preferably under vacuum or in an inert atmosphere. Heating the dual catalyst even in nitrogen at about 200° C. can destroy its unique polymerization behavior, however.

The incorporation of the two chromium compounds must be done in separate steps, otherwise the two chromium species will react in solution to precipitate some inert intermediate. While applicants are not bound by theory, isolating these chromium compounds of different valence on the support appears to stabilize them (or at least stabilize some reactive intermediate).

It is believed that the dual catalyst of this invention provides two types of polymerization sites which are responsible for the production of the broad molecular weight distribution olefin polymers. The distribution based on curves obtained from gel permeation chromatography is broad, sometimes distinctly bimodal. Moreover, because of the use of anhydrous impregnation of the second chromium species, and the use of a large pore volume silica-titanium cogel, both broad molecular weight distribution and high melt flow are simultaneously obtained in slurry polymerization systems.

The catalyst of this invention can be used to polymerize at least one mono-1-olefin containing 2 to 8 carbon atoms per molecule. The invention is of particular applicability in producing ethylene homopolymers and copolymers from mixtures of ethylene and one or more comonomers selected from 1-olefins containing 3 to 8 carbon atoms per molecule. Exemplary comonomers include aliphatic 1-olefins, such as propylene, 1-butene, 1-hexene, and other higher olefins and conjugated or non-conjugated diolefins such as 1,3-butadiene, isoprene, piperylene, 2,3-dimethyl-1,3-butadiene, 1,4-pentadiene, 1,7-hexadiene, and other such diolefins and mixtures thereof. Ethylene copolymers preferably constitute at least about 90, preferably 95 to 99 mole percent polymerized ethylene units. Ethylene, propylene, 1-butene and 1-hexene are especially preferred.

The polymers can be prepared from the catalyst of this invention by solution polymerization, slurry polymerization, and gas phase polymerization techniques using conventional equipment and contacting processes. Contacting of the monomer or monomers with the catalyst can be effected by any manner known in the art of solid catalysts. One convenient method is to suspend the catalyst in the organic medium and to agitate the mixture to maintain the catalyst in suspension throughout the polymerization process. Other known contacting methods such as fluidized bed, gravitating bed, and fixed bed can also be employed. Reference to the production of ethylene polymers in a particle form process is disclosed in U.S. Pat. No. 3,624,063 which issued Nov. 30, 1971 to Witt, the disclosure of which is hereby incorporated by reference.

The catalyst of this invention is particularly suitable for use in slurry polymerizations to produce relatively high melt index (MI) polymers, i.e., a polymer having a melt index of at least 0.1. The slurry process is generally carried out in an inert diluent such as paraffin, aromatic or cycloparaffin hydrocarbon. For predominantly ethylene polymers, a temperature of about 66°–110° C. is employed. Pressures in the particle form process can vary from about 110 to about 700 psia (0.76–4.8 MPA) or higher. The catalyst is kept in suspension and is contacted with the monomers or monomers at sufficient pressure to maintain the medium and at least a portion of the monomer or monomers in the liquid phase. The medium and temperature are thus selected such that the polymer is produced as solid particles and is recovered in that form. In all instances, catalyst concentrations can be such that the chromium content ranges from 0.001 to about 1 weight percent based on the weight of the reactor contents.

The total chromium on the catalyst from all sources generally constitutes 0.01 to 10, preferably 0.1 to 1 weight percent chromium based on the weight of the silica-containing base.

The weight ratio of hexavalent chromium to lower valent chromium species in the catalyst as prepared can range from about 0.1:1 to 10:1, more preferably from about 0.5:1 to about 3:1 since especially active catalysts are formed in that range.

Hydrogen can be used to further increase the melt index if desired in a manner well known in the art. When hydrogen is used its partial pressure can be up to 120 psia, preferably within the range of 20 to about 50 psia (0.4–0.38 MPA).

Polymers are thus produced having melt index values of about 0.1 or lower to about 7 or higher in the absence of molecular weight modifiers such as hydrogen. The melt index is determined in accordance with ASTM D1238-65T, Condition E.

In addition to the relatively high melt index achieved, the polymers produced in accordance with the invention exhibit broad molecular weight distribution as defined by the ratio of weight average molecular weight to number average weight ($M_w/M_n$). For instance, the $M_w/M_n$ can range from about 5 to more than 40 for the melt index range of 0.1 to 7, thus making these polymers of commercial interest for applications such as blow molding of bottles and other hollow articles which require a moderate to relatively high melt index and broad molecular weight distribution. The values greater than 20 which are easily obtained in accordance with this invention are higher than those generally obtainable in the art by any means.

The moderate melt index range of 0.1 to ∂is ideally suited for blow molding applications. Absent some means to raise the melt index, i.e., increase flow or lower molecular weight, the slurry process can produce polymer with a molecular weight so high the standard melt index value is zero and such polymers are not generally suited for blow molding. The moderate to relatively high melt index, broad molecular weight distribution polymers produced by this invention, which are ideally suited for blow molding operations are thus distinguished from very high melt flow narrow molecular weight distribution polymers which are useful in such applications as high speed paper coating and are also distinguished from very low melt flow polymers (regular MI less than 0.1) which are useful for applications such as rotational molding.

EXAMPLE I

A series of catalysts was prepared from portions of a commercially obtained catalyst consisting of about 1 weight percent hexavalent chromium (chromium A) supported on 98/2 silica/titania (2 weight percent titanium) cogel. The cogel was prepared by coprecipitating a silicate and a titanium compound and was azeotrope dried with ethyl acetate to remove water and calcined as specified. Chromium acetate was the chromium source from which the hexavalent chromium was formed on said calcination. Each calcined portion was impregnated with a hexane solution of a diarene chromium (chromium B). The hexane was largely removed by gentle boiling leaving an almost dry, dark green catalyst which was usually used for polymerization immediately without further calcination since catalytic activity declined after a few days.

A suitable portion of each prepared catalyst was charged to a 2 liter stirred, stainless steel reactor containing about 1 liter (600 g) of dry isobutane. Each run was conducted for a time estimated to produce about 5000 g polymer per g catalyst (g/g). Each run was terminated by flashing the isobutane diluent and monomer(s) from the reactor, removing the polymeric product and drying and weighing it to determine the yield. Physical properties of the polymers were determined in accordance with standard ASTM procedures, e.g., melt index (MI) as per D1238-65T, Condition E, high load melt index (HLMI) as per D1238-65T, Condition F, and density in g/cc as per ASTM D1505-68. The weight average molecular weight ($M_w$) and number average molecular weight ($M_n$) were determined by means of size exclusion chromatography (gel permeation chromatography).

The results obtained are given in Table I.

The results given in Table I show at a given catalyst calcining temperature for a constant chromium A content and at a constant reactor temperature during polymerization that as the chromium B ($Cr°$, i.e., zero valent) content increases, the molecular weight distribution of the polymeric product increases as indicated by the increasing $M_w/M_n$ values. This is shown in runs 2–4 and runs 11–13. As can be seen, $M_w/M_n$ values of greater than 20 can be achieved. In other runs, values of about 20 to 40 for the $M_w/M_n$ were obtained. The results also indicate an increase in melt index for the product with increasing $Cr°$ content and a decrease in the density of the product with increasing $Cr°$ content. The lower density observed suggests that part of the ethylene in the reactor is converted by the catalyst system to a higher 1-olefin, perhaps 1-butene or 1-hexene, which compolymerized with the ethylene to form relatively low density ethylene copolymers. The other runs show that active catalyst systems are produced which are operable at different reactor temperatures, at different calcining conditions for the chromium A catalyst, and at several silica/titania weight ratios. The calcining temperature is preferably at least 750° C., preferably about 800° C. to 900° C.

Control

A series of cataysts was prepared from portions of the commercially obtained catalyst (cogel) described in the first example and calcined as specified.

Ethylene polymerization was conducted in the manner described earlier in Example 1 with the exception that a solution of the diarene chromium compound (chromium B) in n-hexane was added to the reactor as a separate stream prior to the start of the polymerization. Sufficient solution was added to provide the amount of $Cr°$ shown based on the weight of catalyst charged to the reactor.

Polymer was recovered and its physical properties were determined as described in the first example.

The results obtained are given in Table II.

TABLE I

| | | Catalyst | | | Ethylene Polymerization | | | Polymer Properties | | | | | |
|---|---|---|---|---|---|---|---|---|---|---|---|---|---|
| Run No. | Support Type | Calcining Temp. °C. | Weight % CrA[a] | Weight % CrB[b] | Reactor Temp. °C. | Minutes On Stream Induction | Minutes On Stream Polym. | Calculated Catalyst Productivity g/g | MI | HLMI | Density g/cc | Mw ×10⁻³ | Mn ×10⁻³ | Mw/Mn |
| 1 | 98/2 silica/titania[e] | 871 | 1 | 0.5 | 96 | 15 | 50 | 5330 | 0.2 | 102 | 0.960 | 184 | 15.0 | 12 |
| 2 | " | " | " | " | 102 | 8 | 40 | 4660 | 0.5 | 77 | .964 | 173 | 13.6 | 13 |
| 3 | " | " | " | 1.0 | " | " | 55 | 6080 | 0.7 | 66 | .953 | 169 | 11.1 | 15 |
| 4 | " | " | " | 1.5 | " | 20 | 120 | 2900 | 3.7 | 80 | .928 | 166 | 6.8 | 24 |
| 5 | " | " | " | " | 96 | " | 60 | 3000 | 0.2 | 96 | .946 | —[c] | — | — |
| 6 | " | " | " | 0.6 | 107 | 5 | 76 | 3990 | 6.5 | 38 | .953 | 135 | 12.3 | 11 |
| 7 | " | " | " | " | 102 | 13 | 38 | 4790 | 1.8 | 60 | .958 | 124 | 11.6 | 11 |
| 8[d] | " | " | " | 1.6 | 107 | fouled | — | 1450 est. | 1.0 | 83 | .925 | 164 | 9.1 | 18 |
| 9 | 95/5 silica/titania | 593 | " | 1.0 | 93 | 19 | 100 | 5600 | 0.01 | 120 | .957 | — | — | — |
| 10 | " | 704 | " | " | " | 3 | 76 | 3990 | 0.005 | 132 | .956 | — | — | — |
| 11 | 98/2 silica/titania | 871 | " | 0.5 | 99 | 10 | 35 | 2800 | 0.14 | 130 | .960 | 172 | 12.9 | 13 |
| 12 | " | " | " | 1.0 | " | 0 | 30 | 2640 | 0.15 | 88 | .960 | 200 | 11.7 | 17 |
| 13 | " | " | " | 1.5 | " | 13 | 60 | 4760 | 0.21 | 81 | .952 | 232 | 12.4 | 19 |

Notes:
[a]Chromium source is chromium III acetate.
[b]Chromium source is dicumeme chromium in runs 1–11, dibenzene chromium in runs 12–14.
[c]A dash signifies no determination.
[d]Hydrogen, partial pressure of 0.34 MPa, added to reactor prior to polymerization.
[e]2% Titanium or 3.3 percent titania.

TABLE II

Ethylene Polymerization, Cr° Compound Added To Reactor

| Run No. | Support Type | Calcining Temp. °C. | CrA | CrB[b] | Reactor Temp. °C. | Minutes On Stream Induction | Minutes On Stream Polym. | Calculated Catalyst Productivity g/g | MI | HLMI MI | Density g/cc | Mw | Mn | Mw/Mn |
|---|---|---|---|---|---|---|---|---|---|---|---|---|---|---|
| 14 | 98/2 silica/titania[a] | 704 | 1 | 1 | 99 | 18 | 70 | 4170 | 0.02 | 228 | 0.955 | 267 | 15.2 | 18 |
| 15 | " | 871 | " | 0 | " | 5 | 35 | 4240 | .26 | 137 | .963 | 176 | 14.6 | 12 |
| 16 | " | " | " | 0.5 | " | 10 | 52 | 4840 | .12 | 129 | .961 | 203 | 14.6 | 14 |
| 17 | " | " | " | 1 | " | 30 | 68 | 4960 | .13 | 115 | .959 | 236 | 16.6 | 14 |
| 18 | " | " | " | 1 | " | 60 | 96 | 5380 | .67 | 89 | .959 | 149 | 15.5 | 9.6 |
| 19 | " | " | " | 2 | " | 15 | 73 | 5080 | .04 | 240 | .955 | 208 | 14.4 | 14 |
| 20 | " | " | " | 3 | " | 10 | 54 | 4880 | .03 | 172 | .953 | 260 | 13.8 | 19 |
| 21[c] | " | " | " | 3 | " | 39 | 160 | 2760 | .19 | 83 | .958 | 192 | 10.4 | 18 |
| 22 | " | " | " | 1 | " | 15 | 52 | 5000 | .12 | 117 | .959 | 197 | 12.5 | 16 |
| 23 | " | " | " | 2 | " | 15 | 70 | 5120 | .19 | 125 | .955 | 192 | 11.4 | 16 |
| 24 | " | " | " | 3 | " | 20 | 80 | 2370 | 4.7[d] | —[e] | .955 | 231 | 13.9 | 17 |

Notes:
[a]Calcined in presence of chromium III acetate as the chromium source.
[b]Chromium source is dicumene chromium in runs 14–21, dibenzene chromium in runs 22–24. The amount added to the reactor is expressed as weight percent of the catalyst containing chromium A (the cogel catalyst).
[c]Hydrogen, partial pressure of 0.45 MPa added to reactor prior to polymerization.
[d]High load melt index.
[e]Not determined.

The results in Table II show that, as the chromium B (Cr°) content added to the reactor is increased, the $M_w/M_n$ values increase which indicates that broader molecular weight distribution polymer is being produced. Exemplary of the trend are the results given in runs 15–17 and runs 18–20. It can be seen, however, that more Cr° is required to obtain a given increase in $M_w/M_n$ when it is added to the reactor as opposed to being impregnated onto the chromium A-containing catalyst prior to charging the composite to the reactor. For example, compare runs 11–13 of Table I with runs 22–24 of Table II. This indicates that the presence of $Cr^{+6}$ and Cr° on the catalyst is more efficient than contact between $Cr^{+6}$ on the catalyst and Cr° in solution.

EXAMPLE II

Another series of catalysts was prepared from calcined silica-titania cogels and a silica (all commercially available). In some instances, runs 25–27, the support material was calcined in the absence of any chromium compound and thereafter two types of chromium compounds dissolved in n-hexene were impregnated, each separately on the recovered substrate. In these runs, chromium A was t-butyl chromate ($Cr^{+6}$) and chromium B was dicumene chromium (Cr°). The solvent was allowed to evaporate and each catalyst was used to polymerize ethylene without further treatment.

In runs 28–31, a 98/2 silica-titania cogel containing 1 weight percent chromium as chromium trioxide, calcined at 871° C. in air, was impregnated with a solution of chromium (III) octoate in n-hexane. The solvent was allowed to evaporate and each catalyst was used to polymerize ethylene without further treatment.

In run 32, a sample of microspheroidal silica containing about 0.1 weight percent alumina was impregnated with a solution of chromium (III) acetate in water. After the solvent evaporated the composite was calcined in nitrogen thus leaving chromium as $Cr^{+3}$. The cooled, recovered catalyst was then impregnated with a solution of dicumene chromium in n-hexane and the solvent was allowed to evaporate. The resulting catalyst was used to polymerize ethylene without further treatment.

Ethylene polymerization was carried out with each catalyst, each product recovered, and its physical properties determined as described in the first example.

The results obtained are given in Table III.

TABLE III

Ethylene Polymerization

| Run No. | Support Type | Calcining Temp. °C. | Weight % CrA | Weight % CrB | Reactor Temp. °C. | Minutes On Stream Induction | Minutes On Stream Polym. | Calculated Catalyst Productivity g/g | HLMI MI | MI | Density g/cc |
|---|---|---|---|---|---|---|---|---|---|---|---|
| 25[a] | 95/5 silica-titania | 816 | 0.5[b] | 0.5[c] | 93 | 14 | 90 | 500 | 0.43 | 113 | 0.958 |
| 26[a] | 95/5 silica titania | 704 | " | 0.5[c] | " | 150 | — | 1670 | .10 | 195 | .961 |
| 27[a] | 98/2 silica-titania | 871 | 1.0 | 1.5[c] | " | 24 | 95 | 3390 | .10 | 86 | .958 |
| 28 | 98/2 silica-titania[d] | " | " | 0.5[e] | 96 | 97 | — | 4700 | .14 | 165 | .962 |
| 29 | 98/2 silica-titania[d] | " | " | 0.5[e] | 99 | 62 | — | 4530 | .57 | 81 | —[h] |
| 30 | 98/2 silica-titania[d] | " | " | 0.5[e] | 100 | 7 | 30 | 1120 | .04 | 81 | .960 |
| 31 | 98/2 silica-titania[d] | " | " | 0.5[e] | 96 | 0 | 48 | 4710 | .02 | 202 | — |

TABLE III-continued

| | | Ethylene Polymerization | | | | | | | | |
|---|---|---|---|---|---|---|---|---|---|---|
| | | Calcining Temp. | Weight % | | Reactor Temp. | Minutes On Stream | | Calculated Catalyst Productivity | Polymer Properties | | |
| Run No. | Support Type | °C. | CrA | CrB | °C. | Induction | Polym. | g/g | MI | HLMI MI | Density g/cc |
| 32 | 100 silica[f] | 704 | 1.0[g] | 0.5[c] | 93 | 1 | 110 | 3120 | .016 | 165 | .937 |

Notes:
[a] Calcined in absence of any Cr compound.
[b] Impregnated with t-butyl chromate to give indicated amount of chromium as $Cr^{+6}$.
[c] Impregnated with dicumene chromium to give indicated amount of chromium as $Cr°$.
[d] Calcined in presence of $Cr^{+6}$ as $CrO_3$.
[e] Impregnated with chromium (III) octoate to give indicated amount of chromium as $Cr^{+3}$.
[f] Commercially obtained microspheroidal silica.
[g] Calcined on $N_2$ in presence of chromium (III) acetate before impregnation with dicumene chromium.
[h] A dash signifies not reported.

The results shown in Table III indicate that the molecular weight distribution of the various polymers produced with the invention catalysts were all broad based on the high HLMI/MI values obtained. It can be seen in runs 28–31 when the catalyst contains chromium A as $Cr^{+6}$ and chromium B as $Cr^{+3}$ that polymer produced with this combination does not appear to lower the polymer density. In run 32, the polymer density is lowered when the catalyst contains chromium A as $Cr^{+3}$ and chromium B as $Cr°$. The results in the other tables indicates that polymer density is lowered also when the catalyst contains chromium A as $Cr^{+6}$ and chromium B as $Cr°$. It appears that $Cr°$ may be responsible for lowering polymer density in combinations employing it.

The overall results suggest that by employing suitable combinations of chromium A and chromium B in the catalyst it is possible to alter the molecular weight distribution of the polymer and to lower the density of the polymer simultaneously.

While this invention has been described in detail for the purpose of illustration it is not to be construed as limited thereby but is intended to cover all changes and modifications within the spirit and scope thereof.

I claim:

1. A process for producing a catalyst having chromium present in both the hexavalent state and a lower valence state comprising forming a silica-containing support containing hexavalvent chromium, thereafter as a separate step anhydrously impregnating said support with a chromium component in an anhydrous solvent wherein the chromium has a valence of less than 6, and thereafter removing said solvent by gentle heating at a temperature of no more than about 100° C. and recovering said catalyst as the finished product of the process.

2. A method according to claim 1 wherein said silica-containing support is a silica-titania cogel and wherein a weight ratio of said hexavalent chromium to said chromium having a valence of less than 6 is within the range of about 0.5:1 to about 3:1 and wherein a total amount of chromium present is within the range of 0.01 to 10 weight percent based on the weight of said support.

3. A method according to claim 1 wherein said chromium component having a valence less than 6 has a valence selected from 0, +2, and +3.

4. A method according to claim 3 wherein said chromium component having a valence of less than 6 is a π-bonded organochromium compound.

5. A method according to claim 3 wherein said π-bonded organochromium compound is selected from dibenzene chromium and dicumene chromium.

6. A method according to claim 1 wherein said anhydrous impregnation is carried out using n-hexane as the solvent and wherein said solvent is removed by heating at said temperature of no more than about 100° C. under vacuum or in an inert atmosphere.

7. A method according to claim 1 wherein said silica-containing support containing a hexavalent chromium compound is formed by anhydrously impregnating a silica-containing support with a hexavalent chromium compound.

8. A method according to claim 1 wherein said silica-containing support containing a hexavalent chromium compound is formed by incorporating a chromium compound having a valence of lower than 6 with said silica-containing support and thereafter calcining in the presence of oxygen.

9. A method according to claim 1 wherein said anhydrous impregnation is carried out in the substantial absence of oxygen.

10. A method according to claim 9 wherein said silica-containing support is a silica-titania cogel and said chromium component having a valence of less than 6 is selected from dibenzene chromium and dicumene chromium.

11. A catalyst produced by the method of claim 10, wherein said lower valence state chromium in the finished product catalyst is selected from dibenzene chromium and dicumene chromium.

12. A catalyst produced by the method of claim 1 wherein said lower valence state chromium in the finished product catalyst is a zerovalent chromium compound.

13. A process for producing a catalyst having chromium present in both the hexavalent state and a lower valence state consisting essentially of forming a dried silica-containing support containing a chromium compound wherein the chromium has a valence of less than 6, thereafter as a separate step anhydrously impregnating said support with a hexavalent chromium compound as a solution in an anhydrous solvent and thereafter removing said solvent by gentle heating at a temperature of not more than about 100° C.

14. A method according to claim 13 wherein said silica-containing support is a silica-titania cogel and wherein a weight ratio of said hexavalent chromium to said chromium having a valence of less than 6 is within the range of from about 0.5:1 to about 3:1 and wherein a total amount of chromium present is within the range of 0.01 to 10 weight percent based on the weight of said support.

15. A method according to claim 14 wherein said chromium compound having a valence of less than 6 has a valence selected from 0, +2 and +3.

16. A method according to claim 15 wherein said chromium compound having a valence of less than 6 is a π-bonded organochromium compound.

17. A method according to claim 15 wherein said π-bonded organochromium compound is selected from dicumene chromium and dibenzene chromium.

18. A method according to claim 17 wherein said hexavalent chromium compound is tertiary butyl chromate.

19. A method according to claim 13 wherein said hexavalent chromium compound is chromium trioxide.

20. A method according to claim 13 wherein said chromium compound having a valence of less than 6 is combined with said support by anhydrous impregnation and wherein said anhydrous impregnations are carried out utilizing n-hexane as the solvent.

21. A method according to claim 13 wherein said impregnation is carried out in the substantial absence of oxygen.

22. A method according to claim 13 wherein said hexavalent chromium compound is tertiary butyl chromate, said chromium compound having a valence of less than 6 is selected from dibenzene chromium and dicumene chromium and wherein said support is a silica-titanium cogel.

23. A catalyst produced by the method of claim 22 wherein said lower valence state chromium in the finished product catalyst is selected from dibenzene chromium and dicumene chromium.

24. A catalyst produced by the method of claim 13 wherein said lower valence state chromium in the finished product catalyst is a zerovalent chromium compound.

* * * * *